US008780335B2

(12) United States Patent
Van Steenberge et al.

(10) Patent No.: US 8,780,335 B2
(45) Date of Patent: Jul. 15, 2014

(54) OPTICAL SHEAR SENSOR AND METHOD OF PRODUCING SUCH AN OPTICAL SHEAR SENSOR

(71) Applicants: IMEC, Leuven (BE); Universiteit Gent, Ghent (BE)

(72) Inventors: Geert Van Steenberge, Sint-Amandsberg (BE); Jeroen Missinne, Ghent (BE); Erwin Bosman, Ghent (BE); Bram Van Hoe, Ghent (BE)

(73) Assignees: IMEC, Leuven (BE); Universiteit Geent, Ghent (BE)

( * ) Notice: Subject to any disclaimer, the term of this patent is extended or adjusted under 35 U.S.C. 154(b) by 92 days.

(21) Appl. No.: 13/633,570

(22) Filed: Oct. 2, 2012

(65) Prior Publication Data

US 2013/0036829 A1 Feb. 14, 2013

Related U.S. Application Data

(63) Continuation of application No. PCT/EP2011/055517, filed on Apr. 8, 2011.

(60) Provisional application No. 61/323,081, filed on Apr. 12, 2010.

(51) Int. Cl.
*G01B 11/16* (2006.01)
*G01L 1/24* (2006.01)

(52) U.S. Cl.
CPC .............. *G01B 11/16* (2013.01); *G01B 11/165* (2013.01); *G01L 1/24* (2013.01)
USPC .......................................................... 356/32

(58) Field of Classification Search
CPC ..................... G01B 11/16–11/164; G01L 1/24
See application file for complete search history.

(56) References Cited

U.S. PATENT DOCUMENTS

| 5,442,169 | A  | * | 8/1995  | Kunz .................... 250/227.21 |
| 7,295,724 | B2 |   | 11/2007 | Wang et al. |
| 7,466,879 | B2 |   | 12/2008 | Tjin |
| 2002/0162956 | A1 | * | 11/2002 | Gharib et al. ............. 250/237 G |
| 2009/0315989 | A1 |   | 12/2009 | Adelson |

OTHER PUBLICATIONS

Wang et al., "A shear and plantar pressure sensor based on fiber-optic bend loss", Journal of Rehabilitation Research & Development, vol. 42, No. 3, pp. 315-326, May/Jun. 2005.

(Continued)

*Primary Examiner* — Michael P Stafira
(74) *Attorney, Agent, or Firm* — Knobbe Martens Olson & Bear LLP

(57) ABSTRACT

An optical shear sensor that includes a first and second outer surface at opposing sides and a sensing element is disclosed. In one aspect, the sensing element has an optoelectronic source for emitting light of a predetermined wavelength and having a source front surface where light exits the optoelectronic source, and a photodetector for detecting light of the predetermined wavelength and having a detector front surface where light of the optoelectronic source is received. The optoelectronic source is positioned along the first outer surface and emits light towards the second outer surface. A flexible sensing layer transparent to the predetermined wavelength covers the front surface of the optoelectronic source and the front surface of the photodetector. Upon application of a shear stress, the sensing layer deforms elastically and the outer surfaces are displaced along directions parallel to each other and the source front surface so the intensity of light detected by the photodetector changes.

21 Claims, 6 Drawing Sheets

(56) References Cited

OTHER PUBLICATIONS

Lebar et al., "An Optoelectric Plantar "Shear" Sensing Transducer: Design, Validation, and Preliminary Subject Tests", IEEE Transactions on Rehabilitation Engineering, vol. 4, No. 4, Dec. 1996, pp. 310-319.

International Search Report for International Application No. PCT/EP2011/055517 dated Sep. 15, 2011 by European Patent Office.

Chu et al., "Silicon three-axial tactile sensor", Sens. Actuators A. Phys., vol. 54, No. 1-3, Jun. 1996, pp. 505-510.

Kane et al., "A traction stress sensor array for use in high-resolution robotic tactile imaging", J. Microelectromech. Syst., vol. 9, No. 4, Dec. 2000, pp. 425-434.

Engel et al., "Development of polyimide flexible tactile sensor skin", J. Micromech. Microeng., vol. 13, No. 3, May 2003, pp. 359-366.

Naughton et al., "Modern developments in shear-stress measurement", Progress in Aerospace Science 38 (2002), pp. 515-570.

Lee et al., "Normal and Shear Force Measurement Using a Flexible Polymer Tactile Sensor with Embedded Multiple Capacitors", Journal of Microelectromechanical Systems, vol. 17, No. 4, Aug. 2008, pp. 934-942.

Xu et al., "Flexible shear-stress sensor skin and its application to unmanned aerial vehicles", Sensors and Actuators A 105 (2003), pp. 321-329.

Hsieh et al., "A Contact-Type Piezoresistive Micro-Shear Stress Sensor for Above-Knee Prosthesis Application", IEEE Journal of Microelectromechanical Systems, vol. 10, No. 1, Mar. 2001.

\* cited by examiner

4(e)

4(f)

4(g)

OPTICAL SHEAR SENSOR AND METHOD OF PRODUCING SUCH AN OPTICAL SHEAR SENSOR

CROSS REFERENCE TO RELATED APPLICATIONS

This application is a continuation of PCT Application No. PCT/EP2011/055517, filed Apr. 8, 2011, which claims priority under 35 U.S.C. §119(e) to U.S. provisional patent application 61/323,081 filed on Apr. 12, 2010. Each of the above applications is incorporated herein by reference in its entirety.

BACKGROUND OF THE INVENTION

1. Field of the Invention

The disclosed technology relates to optical shear sensors, more in particular to compact, flexible and/or stretchable optical shear sensors and to methods for fabricating such shear sensors.

2. Description of the Related Technology

For several applications, such as for example for skin friction measurements (e.g., diabetic patients, shear between prosthesis and skin) and for robotic applications (artificial skin) there is a need for compact shear sensors and shear sensor arrays allowing distributed shear sensing (tactile sensors). Preferably such shear sensors and shear sensor arrays are flexible and/or stretchable such that they can be adapted to conform to 3D surfaces. It is an additional advantage of flexible and stretchable sensors or sensor arrays that they may have a better reliability in terms of mechanical stability (e.g. shock and vibration absorption) as compared to rigid sensors and sensor arrays.

There have been several reports on tactile sensors that can measure shear stresses. Most of these sensors are fabricated using silicon micro-electro-mechanical systems (MEMS) technology. It is an advantage of using MEMS technology that it allows implementing tactile sensors with a fine spatial resolution and sensitivity comparable to human fingers. One of the disadvantages related to MEMS-based sensors is that they are not flexible because they are formed on a rigid silicon substrate. MEMS-based sensors often comprise floating elements, which may limit their robustness.

Shear sensors can be based on electrical measurements, such as for example capacitive measurements, magnetoresistive measurements or piezoelectric measurements. It is a disadvantage of sensors based on electrical measurements that they may be affected by electromagnetic field interference and that they may suffer from hysteresis and drift. Therefore, optical sensors may be preferred. Apart from their immunity to electromagnetic field interference, optical sensors can have a high sensitivity and a large dynamic range, and a highly linear response. Optical sensors are potentially compact and they can be embedded in or attached to an object to be sensed.

Optical shear sensors based on fiber-optic bend loss have been proposed. The basic configuration of such a fiber-optic shear sensor is a multi-layered sensor in which the top and bottom layers are composed of a pressure sensor mesh, each mesh comprising two sets of parallel fiber planes. Coordinates of pressure points are taken from the top and bottom mesh sensors to determine shear. Pressure points that are originally located above each other are shifted out of alignment because of shearing forces, and the amount of misalignment is related to the amount of shear. However, the spatial resolution that can be obtained by this type of shear sensor is limited. For example, in "A shear and plantar pressure sensor based on fiber-optic bend loss", W-C. Wang et al, Journal of Rehabilitation Research & Development, Vol. 42, No. 3, pages 315-326, May/June 2005, a spatial resolution of 1 cm is reported.

In U.S. Pat. No. 7,295,724 a flexible optical distributed shear sensor is described, the sensor comprising a flexible substrate with a waveguide formed thereon. The waveguide comprises several Bragg gratings along the waveguide path, each Bragg grating having a characteristic Bragg wavelength that shifts in response to an applied load due to elongation or compression of the grating. These wavelength shifts are monitored to determine the amount of applied pressure on the gratings. To measure shear stress, two flexible substrates with the waveguide and Bragg gratings are provided on top of each other such that the waveguides and gratings are perpendicular to each other. Read-out of this type of sensors is rather complicated and expensive, as it requires spectral measurements.

In U.S. Pat. No. 7,466,879 a flexible optical shear sensor is described wherein an optical fiber with a Bragg grating is embedded at a small angle within a deformable layer, between an upper layer and a lower layer, a first part of the optical fiber being anchored to the upper layer and a second part of the optical fiber being anchored to the lower layer. When a shear force is applied on the upper surface of the sensor, the upper layer moves with respect to the lower layer in the direction of the applied shear force. This relative movement between the upper layer and the lower layer deforms the rubber matrix and leads to stretching of the embedded fiber, resulting in a shift of the Bragg wavelength. Read-out of this type of sensors is rather complicated and expensive, as it requires spectral measurements.

SUMMARY OF CERTAIN INVENTIVE ASPECTS

Certain inventive aspects relate to compact, flexible and/or stretchable optical shear sensors having a good spatial resolution, e.g. down to about 250 micrometer, wherein read-out of the shear sensors is less complicated as compared to prior art devices and wherein read-out of the shear sensors can be performed at a single predetermined wavelength, such that the need for spectral measurements can be avoided.

One aspect relates to a compact, flexible and/or stretchable optical shear sensor wherein the shear sensor may comprise a first and a second outer surface at opposing sides of the optical shear sensor and at least one sensing element, the at least one sensing element comprising: an optoelectronic source for emitting light of a predetermined wavelength, the optoelectronic source having a source front surface; at least one photodetector for detecting light of the predetermined wavelength, the at least one photodetector having a detector front surface.

The optoelectronic source is positioned along the first outer surface and emits light towards the second outer surface.

A flexible sensing layer covers both the front surface of the optoelectronic source and the front surface of the photodetector, the sensing layer being transparent to the predetermined wavelength.

The optoelectronic source, the photodetector, the second outer surface and the sensing layer are arranged such that upon application of a shear stress onto the optical shear sensor the sensing layer deforms elastically and the first and the second outer surface are displaced along directions parallel to each other and the source front surface such that the intensity of light emitted by the optoelectronic source detected by the photodetector changes, the change in intensity of light emitted by the optoelectronic source detected by the photodetector being indicative of the applied shear stress.

Such an optical shear sensor allows to detect shear stress using a measurement of intensity which is less complicated than a measurement of a wavelength.

With elastic deformation is meant in the context of the current application that after deformation the sensing layer returns to its initial state of before deformation.

According to one inventive aspect, the optoelectronic source and the at least one photodetector are arranged in a stack, with the photodetector positioned along the second surface, such that the source front surface and the detector front surface are substantially parallel and oriented towards each other with the sensing layer in between the optoelectronic source and the at least one photodetector. The optoelectronic source, the photodetector and the sensing layer are arranged such that upon application of a shear stress onto the optical shear sensor the sensing layer deforms such that the optoelectronic source and the photodetector are displaced with respect to each other along directions parallel to each other and the source front surface. It has been found that such a stack can be constructed with relative ease.

According to one inventive aspect, the photodetector is positioned along the first outer surface, the second outer surface comprising a reflector for reflecting light emitted by the optoelectronic device back to the photodetector according to the displacement of the first outer surface with respect to the second outer surface. As in such an embodiment both photodetector and optoelectrical device are on the same surface, electrically interconnecting the photodetector and the optoelectrical device becomes easier.

The sensing element may further comprise electrical contacts to the optoelectronic source and to the at least one photodetector. The electrical contacts can be used to connect the sensing element into a further electrical circuit.

The electrical contacts of the photodetector and the optoelectronic source may be provided on a single surface of the optical shear sensor such that electrical interconnection into a circuit can be done more easily. Thereto, in the embodiment wherein the optoelectronic source is positioned along the first outer surface and the photodetector is positioned along the second outer surface, through-holes, vias, are for example provided in the sensing layer which are filled with conductive paste, preferably stretchable conductive paste, such that the electric contacts of either the photodetector or the optoelectronic source can be led to the same outer surface of the optical shear sensor.

According to one inventive aspect, the optoelectronic source is embedded in a first embedding layer and the at least one photodetector is embedded in a second embedding layer. The first embedding layer and the second embedding layer can comprise a rigid material. The first embedding layer and/or the second embedding layer can comprise a flexible material, such as for example SU-8, a polyimide, PEN or PET. The first embedding layer and/or the second embedding layer can comprise a stretchable material such as for example a silicone or a polyurethane. The first embedding layer and the second embedding layer can comprise the same material, especially in the embodiment wherein the optoelectronic source and the photodetector are both positioned along the first outer surface, or they can comprise a different material. The sensing layer preferably is sandwiched between the first embedding layer and the second embedding layer, in the embodiment wherein the optoelectronic source is positioned along the first outer surface and the photodetector is positioned along the second outer surface.

When the first and the second embedding layer are for example PEN or PET and can be provided on respective rolls, fabrication of the optical shear sensor according to one inventive aspect becomes possible using a roll-to-roll process for obtaining the optical shear sensor wherein the optoelectronic source is positioned along the first outer surface and the photodetector is positioned along the second outer surface.

According to one inventive aspect, the source front surface of the optoelectronic source is the outer surface of the optoelectronic source at the side where light of the predetermined wavelength exits the optoelectronic source. According to one inventive aspect, the front surface of the photodetector is the outer surface of the photodetector at a side where light from the optoelectronic source is received.

The material of the sensing layer is preferably flexible and/or stretchable. It can for example comprise a polymer, a polyurethane or a silicone.

According to one inventive aspect, the material of the sensing layer has a low hysteresis.

The shear modulus of the sensing layer material can be selected in function of a specific application. For example, the shear modulus of the sensing layer material can be in the range between about 100 kPa and a few 100 MPa, e.g., 300 MPa. By selecting the mechanical properties (shear modulus, bulk modulus, Young's modulus) of the sensing layer material, the sensitivity and the measurement range of the sensing element can be selected. The measurement range may further be affected by the thickness of the sensing layer and by the properties of the optoelectronic source and the photodetector.

According to one inventive aspect, the sensing element comprises one optoelectronic source and one photodetector, or it can comprise one optoelectronic source and more than one photodetector. It can also comprise more than one optoelectronic source and one or more photodetectors.

According to one inventive aspect, the optoelectronic source and the photodetector may be in an optically aligned position with respect to each other when the sensing element is in a non-actuated state, i.e. in the absence of shear stress on the sensing element along a plane parallel to the source front surface. In the context of the current application with optically aligned position is meant that position of the photodetector and the optoelectronic source with respect to each other is such that light exiting the optoelectronic source is maximally incident on the photodetector.

According to one inventive aspect, the optoelectronic source and the photodetector may be optically misaligned with respect to each other when the sensing element is in a non-actuated state and they may become more optically aligned upon application of a shear stress to the sensing element in a plane parallel to the source front surface.

When a shear stress is applied to the sensing element in a plane parallel to the source front surface, for example a relative displacement of the optoelectronic source and the at least one photodetector, in the embodiment wherein the optoelectronic source is positioned along the first outer surface and the photodetector is positioned along the second outer surface, or for example a relative displacement of the reflector with the photodetector and/or the optoelectronic source in the embodiment wherein the optoelectronic source and the photodetector are both positioned along the first outer surface results in a change of the optical coupling, i.e. the intensity of light emitted by the optoelectronic source detected by the photodetector, between the optoelectronic source and the at least one photodetector. This change is a measure for the applied shear stress.

According to one inventive aspect, the optoelectronic source and the photodetector are chips or integrated circuits such that a small optical shear sensor is obtained.

A shear sensor according to one aspect can comprise a plurality of sensing elements, e.g. arranged in a two-dimensional array. Such a shear sensor comprising a plurality of sensing elements can be used for distributed sensing applications. The minimal spatial resolution for example depends on the size of the optoelectronic source and/or photodetector chip. For example, chip dimensions may be in the order of about 250 micrometer×250 micrometer, enabling a spatial resolution down to about 250 micrometer. In case of smaller chip dimensions, a better spatial resolution can be obtained.

The optoelectronic source may for example comprise a vertical cavity surface emitting laser (VCSEL), a light emitting diode (LED), an organic LED (OLED) or any other suitable optoelectronic source known by a person skilled in the art.

According to one inventive aspect, the sensor is flexible and/or stretchable.

According to one inventive aspect, a transducer is placed along the first and/or second outer surface for converting shear stress applied to the transducer to smaller shear stress such that larger shear stresses can be measured and/or detected. It has been found that such a transducer allows measuring shear stress corresponding to a relative displacement of the photodetector with respect to the optoelectronic source from about 100 uM up to several cm.

According to one inventive aspect, the sensing element comprises a first group of at least one optoelectronic source and a second group of at least one photodetector arranged such that the direction and magnitude of the shear stress can be determined by determining which photodetector of the second group detects light emitted by which optoelectronic source.

According to one inventive aspect, the first group comprises an optoelectronic source and the second group an array of photodetectors, the first group being positioned with respect to the second group such that upon application of a shear stress the intensity measured by a first photodetector of the array decreases while the intensity of a second photodetector of the array increases, the change of intensity from the first photodetector to the second photodetector indicating the direction of the shear stress.

The array of photodetectors may comprise four photodetectors arranged in a square-like configuration, the optoelectronic source being positioned substantially in the center of the square-like configuration as such a configuration allows to determine the direction of the shear stress along all directions of the plane in which the photodetectors are provided.

According to one inventive aspect, the first group comprises an array of different optoelectronic sources, such as for example optoelectronic sources emitting light of a different wavelength and/or emitting light having an intensity which is specifically modulated, and the second group a photodetector, the first group being positioned with respect to the second group such that upon application of a shear stress the light measured by the photodetector is indicative of the position of one of the optoelectronic sources of the array. The array of optoelectronic sources preferably comprises four optoelectronic sources arranged in a square-like configuration, the photodetector being positioned substantially in the center of the square-like configuration as such a configuration allows to determine the direction of the shear stress along all directions of the plane in which the optoelectronic sources are provided.

According to one inventive aspect, the first group also comprises an array of optoelectronic sources. Preferably, the arrays of the first and the second group are substantially linear.

According to one inventive aspect, the linear arrays are positioned perpendicular with respect to each other and the optoelectronic sources are different, e.g. optoelectronic sources emitting light of a different wavelength and/or emitting light having an intensity which is specifically modulated to distinguish between the optoelectronic sources as in the earlier described embodiment.

According to one inventive aspect, the two groups are positioned such that pairs of photodetectors and optoelectronic sources are formed. In a first example, in each pair the optoelectronic source and the photodetector are optically aligned and part of the photodetector or part of the optoelectronic source is covered by a layer that is not transparent to the light emitted by the corresponding optoelectronic source, the part covered being different in each pair such that the intensities measured by the photodetector are indicative of the direction of the shear stress. However, according to a second example, in each pair the optoelectronic source and the photodetector are not optically aligned and the mutual position of the optoelectronic source and the photodetector in each pair are chosen such that upon application of a shear stress, the direction of the shear stress can be determined by determining which photodetectors detect light and the magnitude of the shear stress can be determined by measuring the intensities of the detected light.

According to one inventive aspect, the photodetector is a position sensitive detector such that the direction and/or magnitude of the shear stress can be measured using a single pair of photodetector and optoelectronic source.

According to one inventive aspect, the optical shear sensor is in the form of a foil, more preferably a foil in which the distance between the source front surface and the detector front surface is between about 50 um and 500 um, particularly between about 100 um and 400 um. More particularly, the distance between the source front surface and the detector front surface may be about 200 um as it has been found that such a distance provides good response of the detector in relation to the light emitted by the optoelectronic source.

In one aspect, there is a method for making an optical shear sensor wherein the method comprises providing the optoelectronic source on a first substrate; embedding the optoelectronic source in the first embedding layer; providing the electrical contacts to the optoelectronic source; providing the photodetector on a second substrate; embedding the photodetector in the second embedding layer; providing the electrical contacts to the photodetector; and bonding the first substrate comprising the embedded optoelectronic source to the second substrate comprising the embedded photodetector by the sensing layer such that the front surface of the optoelectronic source and the photodetector are substantially parallel and oriented towards each other. The different steps do not need to be performed in the order as described.

According to one inventive aspect, the processes of providing the optoelectronic source on a first substrate; embedding the optoelectronic source in the first embedding layer; providing the electrical contacts to the optoelectronic source and the processes of providing the photodetector on a second substrate; embedding the photodetector in the second embedding layer; providing the electrical contacts to the photodetector are done separately after which the first substrate comprising the embedded optoelectronic source is bounded to the second substrate comprising the embedded photodetector by the sensing layer such that the optoelectronic source and the photodetector are substantially parallel and oriented towards each other.

According to one inventive aspect, the method is a build-up process comprising the subsequent processes of providing the optoelectronic source on a first substrate; embedding the optoelectronic source in the first embedding layer; providing first electrical contacts to the optoelectronic source; providing the sensing layer on the first embedding layer and the first electrical contacts; providing second electrical contacts for the photodetector to the sensing layer; providing the photodetector on the second electrical contacts such that the front surface of the photodetector and the front surface of the optoelectronic source are substantially parallel and are oriented towards each other; embedding the photodetector in the second embedding layer.

For purposes of summarizing certain inventive aspects and the advantages achieved over the prior art, certain objects and advantages have been described herein above. Of course, it is to be understood that not necessarily all such objects or advantages may be achieved in accordance with any particular embodiment. Thus, for example. those skilled in the art will recognize that the disclosure may be embodied or carried out in a manner that achieves or optimizes one advantage or group of advantages as taught herein without necessarily achieving other objects or advantages as may be taught or suggested herein. Further, it is understood that this summary is merely an example and is not intended to limit the scope of the disclosure. The disclosure, both as to organization and method of operation, together with features and advantages thereof, may best be understood by reference to the following detailed description when read in conjunction with the accompanying drawings.

Figure 1:
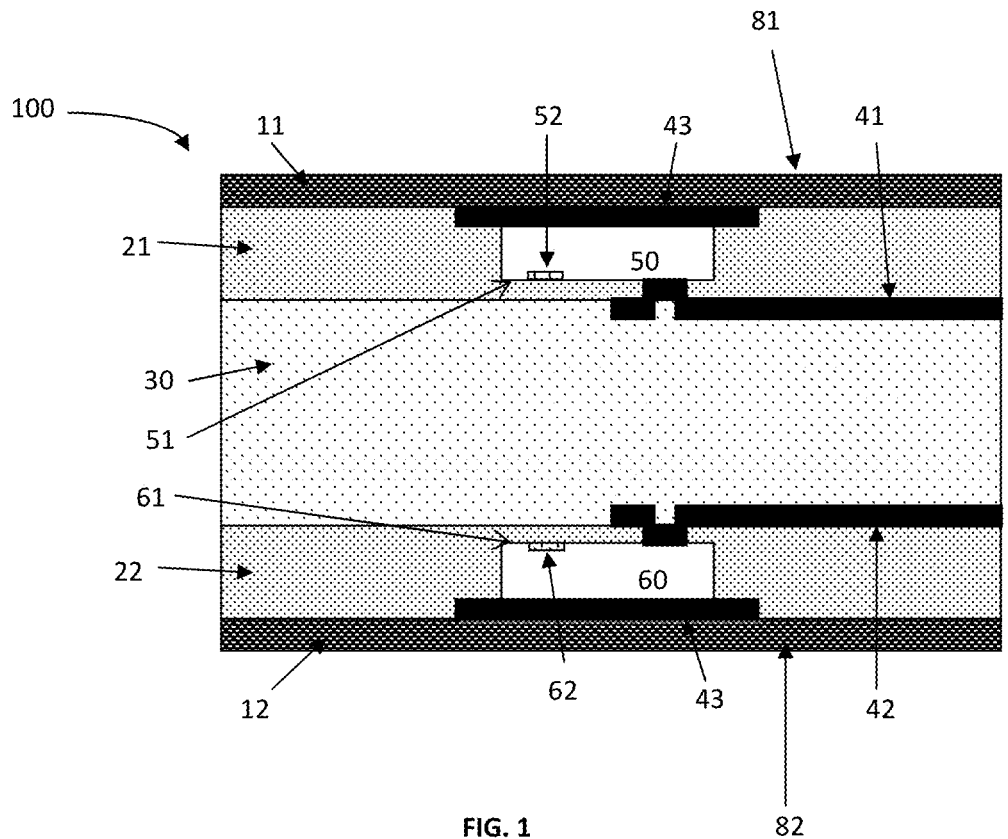
FIG. 1 schematically illustrates a shear sensing element in accordance with one embodiment in a non-actuated state.

In the different drawings, the same reference signs refer to the same or analogous elements.

DETAILED DESCRIPTION OF CERTAIN ILLUSTRATIVE EMBODIMENTS

In the following detailed description, numerous specific details are set forth in order to provide a thorough understanding of the disclosure and how it may be practiced in particular embodiments. However, it will be understood that the present disclosure may be practiced without these specific details. In other instances, well-known methods, procedures and techniques have not been described in detail, so as not to obscure the present disclosure. While the present disclosure will be described with respect to particular embodiments and with reference to certain drawings, the disclosure is not limited hereto. The drawings included and described herein are schematic and are not limiting the scope of the disclosure. It is also noted that in the drawings, the size of some elements may be exaggerated and, therefore, not drawn to scale for illustrative purposes.

Furthermore, the terms first, second, third and the like in the description, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Moreover, the terms top, bottom, over, under and the like in the description are used for descriptive purposes and not necessarily for describing relative positions. It is to be understood that the terms so used are interchangeable under appropriate circumstances and that the embodiments of the disclosure described herein are capable of operation in other orientations than described or illustrated herein.

It is to be noticed that the term "comprising" should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B.

With "rigid" as used in this application is meant stiff, unyielding, i.e. a rigid structure is not adapted to be deformable during normal use of the structure.

With "flexible" as used in this application is meant nonstiff, non-rigid, i.e. bendable but not stretchable. A flexible structure is adapted to be deformable in a certain direction during normal use of the structure, but does not elongate. The length does not change during bending.

With "stretchable" as used in this application is meant resilient, i.e. elastically deformable with elongation. A stretchable structure is adapted to be elastically deformed during normal use (with elongation).

Certain embodiments relate to a compact, flexible and/or stretchable optical shear sensor wherein the shear sensor comprises at least one sensing element, the at least one sensing element comprising: an optoelectronic source for emitting light of a predetermined wavelength, the optoelectronic source having a source front surface; at least one photodetector for detecting light of the predetermined wavelength, the at least one photodetector having a detector front surface, the optoelectronic source and the at least one photodetector being arranged in a stack such that the source front surface and the detector front surface are substantially parallel and oriented towards each other, the stack further comprising a, preferably flexible and/or stretchable, sensing layer in between the optoelectronic source and the photodetector. The sensing element further preferably comprises electrical contacts to the optoelectronic source and to the photodetector.

The optoelectronic source can be embedded in a first embedding layer and the at least one photodetector can be embedded in a second embedding layer. The sensing layer can be sandwiched between the first embedding layer and the second embedding layer.

In one embodiment, the front surface of an optoelectronic source is the outer surface of the optoelectronic source at the side where light of the predetermined wavelength is provided to exit the optoelectronic source. The front surface of a photodetector is the outer surface of the photodetector at a side that is intended for receiving light to be detected.

In certain embodiments, the sensing element comprises one optoelectronic source embedded in a first embedding layer and one photodetector embedded in a second embedding layer. However, the present disclosure is not limited thereto. For example, the optoelectronic source and/or the photodetector can be mounted, e.g. flip-chipped on a supporting layer. For example, the sensing element can comprise more than one photodetector and/or more than one optoelectronic source.

Figure 2:
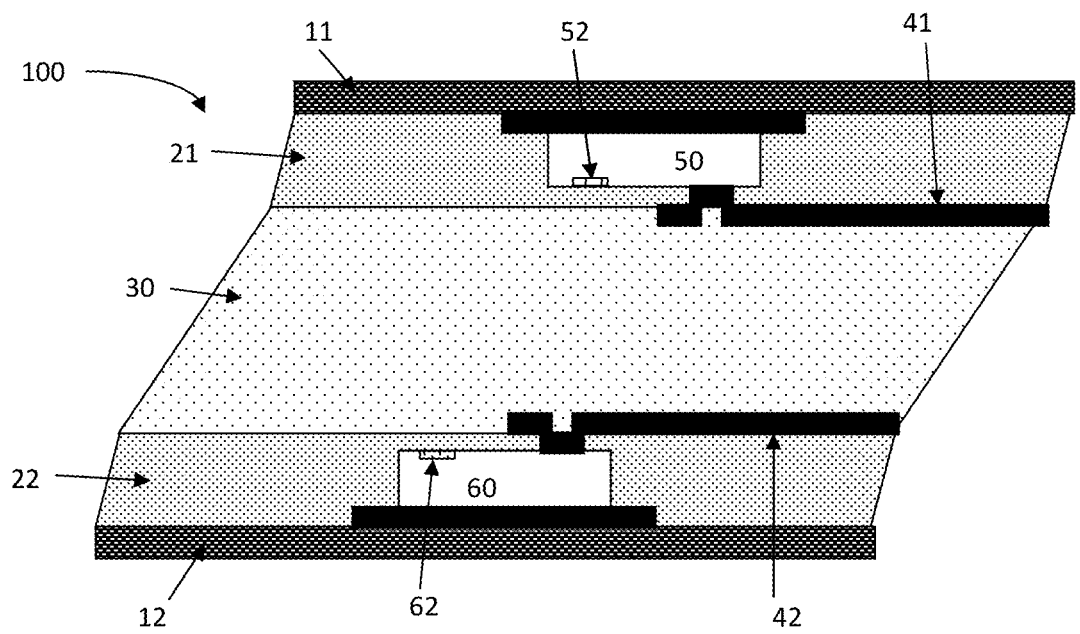
FIG. 2 schematically illustrates a shear sensing element in accordance with the one embodiment in an actuated state.

FIG. 1 schematically illustrates a shear sensing element 100 according to an embodiment of the present disclosure in a non-actuated state, i.e. in the absence of shear stress on the sensing element in a plane parallel to the source front surface. FIG. 2 shows the shear sensing element 100 of FIG. 1 in an actuated state, i.e. in the presence of shear stress on the sensing element in a plane parallel to the source front surface. In FIG. 1 and in FIG. 2 only a single sensing element 100 is shown. A shear sensor according to one embodiment can comprise a single shear sensing element 100. However, a shear sensor according to one embodiment can comprise a plurality of such sensing elements 100. The plurality of sensing elements can for example be arranged in an array, e.g. in a matrix structure. For example, a plurality of flexible sensing elements can be arranged in an array and interconnected by stretchable interconnects, resulting in a stretchable shear sensor array.

As illustrated in FIG. 1 and FIG. 2, a sensing element 100 according to an embodiment of the present disclosure comprises an optoelectronic source 50, such as for example a vertical cavity surface emitting laser (VCSEL), a light emitting device (LED), organic LED (OLED), having a front surface 51, the optoelectronic source 50 being embedded in a first embedding layer 21. The thickness of the first embedding layer 21 can for example be in the range between a few micrometer and a few hundreds of micrometer. As a material for the first embedding layer 21 a rigid material can be used, or a flexible material can be used, such as for example SU-8, a polyimide, polyethylene naphtalate (PEN), or polyethylene terephtalate (PET), or a stretchable material can be used, such as for example a silicone or a polyurethane. The sensing element 100 further comprises a photodetector 60 having a detector front surface 61. The photodetector 60 can for example be a silicon, germanium or indium gallium arsenide photodetector, e.g. photodiode, or an organic photodetector, or any suitable photodetector known by a person skilled in the art. In the embodiment shown, the photodetector 60 is embedded in a second embedding layer 22. The thickness of the second embedding layer 22 can for example be in the range between a few micrometer and a few hundreds of micrometer. The first embedding layer 21 and the second embedding layer 22 can comprise the same material or they can comprise a different material. The optoelectronic source 50 and the photodetector 60 are arranged in the sensing element face to face, i.e. the source front surface 51 of the optoelectronic source 50 where light exits the source is oriented towards the detector front surface 61 of the photodetector 60 where light can be captured by the photodetector. The plane of the source front surface 51 and the plane of the detector front surface 61 are substantially parallel and more preferably substantially planar.

In one embodiment, the optoelectronic source 50 and the photodetector 60 can be arranged such that they are substantially optically aligned when the sensing element 100 is in a non-actuated state, i.e. they can be arranged such that light exiting the optoelectronic source 50 from the light emitting area 52 is maximally incident on the light receiving area 62 of the photodetector 60 when the sensing element is in a non-actuated state. However, other arrangements are possible. For example, in one embodiment the optoelectronic source 50 and the photodetector 60 may be optically non-aligned when the sensing element is in a non-actuated stated and they may become optically aligned upon actuation by a shear stress.

The sensing element shown in FIG. 1 comprises a single photodetector 60. However, in one embodiment the sensing element can comprise more than one photodetector 60, e.g. arranged in a two-dimensional array.

The optoelectronic source 50 is positioned along the first surface 81 and emits light towards the second surface 82. The sensing layer 30 covers both the front surface of the optoelectronic source 50 and the front surface of the photodetector 60.

The optoelectronic source 50 embedded in first embedding layer 21 and the photodetector 60 embedded in second embedding layer 22 are arranged in a stack, the stack further comprising a flexible and/or stretchable sensing layer 30 in between the optoelectronic source 50 and the photodetector 60. The material of the sensing layer 30 can for example be a polymer, a polyurethane or a silicone such as for example Sylgard 184 The sensing layer 30 is preferably made from a material which is compatible with the first 21 and second 22 embedding layer such that the sensing layer does not chemically affects the first 21 and the second 22 embedding layer. The material of the sensing layer 30 can comprise an array of mechanical spacers or a liquid. The sensing layer 30 is preferably optically transparent (at the wavelength of the optoelectronic source 50), flexible and/or stretchable, and it preferably has a low hysteresis and a low shear modulus, for example in the range between about 100 kPa and a few 100 MPa. The thickness of the sensing layer 30 is preferably in the range between a few tens of micrometers to a few hundreds of micrometers, up to a few millimetres. It has been found that by increasing the thickness of the sensing layer 30, the range within which the shear stress applied to the shear sensor can be measured increases.

Furthermore, the sensing element 100 preferably comprises electrical contacts 41, 42, e.g. metal contacts, to the embedded optoelectronic source 50 and the embedded photodetector 60.

In the embodiment shown in FIG. 1, the optoelectronic source 50 is attached to a first substrate 11 and the photodetector 60 is attached to a second substrate 12. In preferred embodiments the first substrate 11 and the second substrate 12 are flexible and/or stretchable substrates. This allows obtaining flexible and/or stretchable sensing elements.

In the embodiment shown in FIG. 1, a heat sink 43 is provided between the optoelectronic source 50 and the first substrate 11 and between the photodetector 60 and the second substrate 12.

FIG. 2 shows the sensing element in an actuated state, i.e. when a shear force is present, i.e. a force which is applied parallel or tangential to a face of the sensing element, substantially parallel to the source front surface and the detector front surface. The shear force or shear stress results in a lateral movement of the embedded optoelectronic source 50 and the embedded photodetector 60 with respect to each other. In this context, a lateral movement refers to a movement substantially parallel to the source front surface and the detector front surface. The relative displacement of the photodetector 60 with respect to the source 50 results in a change of the optical coupling between both components. This change of optical coupling is a measure for the applied shear force. By selecting the mechanical properties (shear modulus, bulk modulus, Young's modulus) of the sensing layer material, the sensitivity and the range of the sensing element can be selected.

Simulations of the behaviour of a sensing element according to one embodiment were performed. A two-dimensional mechanical model was constructed in COMSOL Multiphysics. The model consists of a PDMS sensing layer (Sylgard 184) with a thickness of 150 micrometer sandwiched between two flexible optical packages. A shear force was applied on a surface of the structure while the opposite surface was assumed to be fixed. The applied shear force was a distributed uniform load of 500 N/m, resulting in a maximum lateral displacement of about 30 micrometer. Since this maximum lateral displacement is small compared to the sensing layer thickness, the choice for a linear model is justified.

As for the optical aspect, two-dimensional calculations were performed to evaluate the response of an optical shear sensor according to one embodiment, for varying relative displacements between the photodetector and the optoelectronic source. The optoelectronic source (VCSEL) was modelled as a Gaussian beam with 5 micrometer beam waist and a (half) beam divergence of 7°. The active area of the photodetector was assumed to have a line shape with length d. The sensor response to a relative lateral displacement between the photodetector and the optoelectronic source was calculated for varying ratios between the detector size d and the laser beam diameter. These calculations were performed by determining the amount of power from the Gaussian beam incident on the active area of the detector with length d under increasing lateral displacement. The length of the detector was expressed in terms of the standard deviation of the Gaussian beam curve, which is a measure of the beam size (relative size D of the detector=length d/standard beam deviation). Hence these calculations account for both the size of the photodetector and the distance between the VCSEL and the photodetector, since the beam diameter increases with increasing distance and the relative size of the detector D, expressed in number of standard deviations, decreases.

Figure 3:
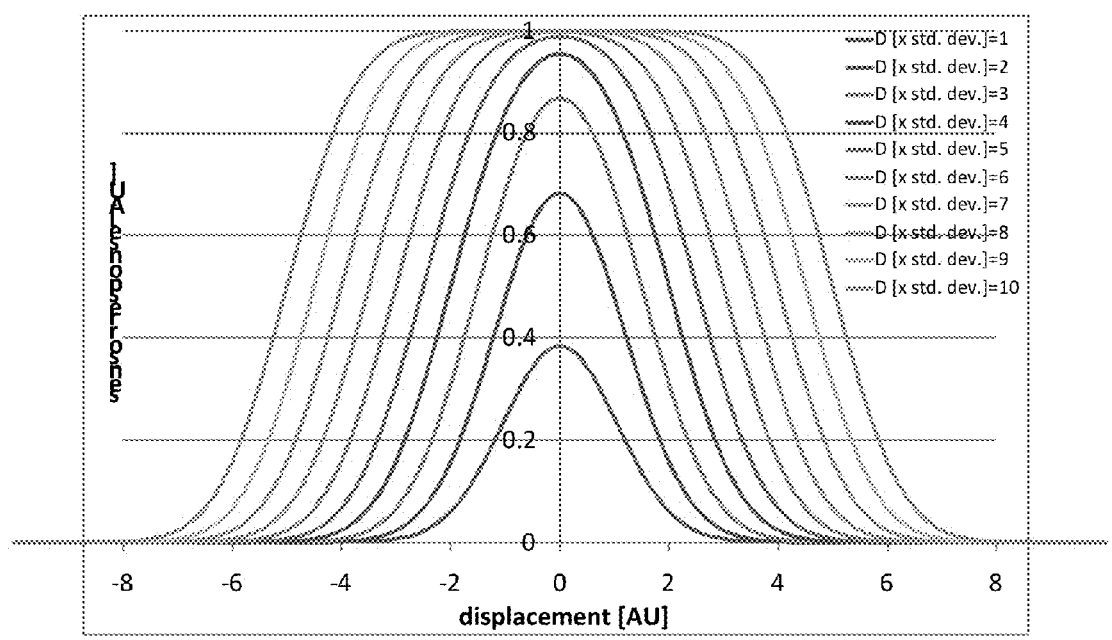
FIG. 3 shows simulation results of a shear sensor according to one embodiment, illustrating the relative sensor output as a function of the relative displacement between the optoelectronic source (VCSEL) and the photodetector.

The results are summarized in FIG. 3, showing the relative sensor response as a function of the relative displacement between the VCSEL and the photodetector. The calculations are done for a ratio D of 1 to 10 of the photodetector size d compared to the laser beam size. For the example shown, the optimal response is achieved for a detector having a size that is four to five times the standard deviation of the incident Gaussian beam. This yields a maximum signal when the sensor is idle and a monotonous decrease with increasing displacement.

The sensing element 100 shown in FIG. 1 and FIG. 2 comprises a single optoelectronic source 50 and a single photodetector 60. However, in other embodiments the sensing element 100 can comprise for example a single optoelectronic source 50 and more than one photodetector 60, e.g. arranged in an array. Such a configuration has a higher resolution and accuracy and allows for example determining the direction of a shear force. In other embodiments the sensing element 100 can comprise for example more than one optoelectronic source 50.

Figure 6:
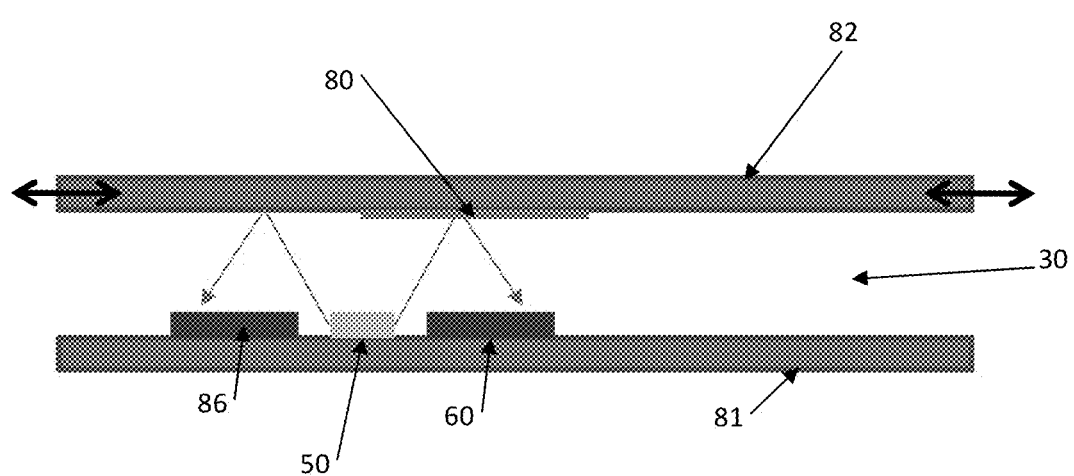
FIG. 6 shows a different embodiment of the optical shear sensor.

A plurality of sensing elements 100 according to one embodiment can be used for forming a sensor array or a tactile sensor. For example, a two-dimensional array of sensing elements, e.g. arranged in a matrix structure, can be used for performing area measurements. For example, the sensing elements in such a two-dimensional array can be connected by stretchable interconnects, such that a stretchable shear sensor array can be formed. Arranging the plurality of sensing elements in an array allows measuring the shear direction. According to a different embodiment of the optical shear sensor, the first outer surface 81 is positioned along the photodetector 60 such that in other words the optoelectric source 50 and the photodetector 60 are arranged along the same outer surface, i.e. the first outer surface 81. This embodiment is for example shown in FIG. 6. According to such an embodiment, the second outer surface 82 comprises a reflector 80 for reflecting light emitted by the optoelectronic source 50 back to the photodetector 60 according to the displacement of the first outer surface 81 with respect to the second outer surface 82. The location and dimensions of the reflector 80 are adapted such that upon application of shear stress to the optical shear sensor, the light emitted by the optoelectric source 50 is no longer reflected by the reflector 80 to at least one photodetector 60. For example, according to FIG. 6, a shear stress to the left will cause that reflection of light emitted by the optoelectronic source 50 will cease to be reflected to photodetector 60, indicating that a shear stress is applied. If another photodetector 86 is positioned at the left of the optoelectronic source it becomes possible that light emitted by the optoelectronic source 50 is now detected at the second photodetector 86. In such case not only can be determined whether a shear stress is applied but in addition the direction of the shear stress can be determined. According to a further embodiment, the reflector 80 is positioned and dimensioned such as to reflect light emitted by the optoelectronic source to both of the photodetectors 86, 60 when no shear stress is being applied, but upon application of a shear stress ceases to reflect light to one or even both of the photodetectors 60, 86 at least indicating that a shear stress has been applied and sometimes even indicating the direction of the shear stress, when for example only one photodetector still receives light emitted by the optoelectronic source 50 and reflected from the reflector 80.

Figure 5A:
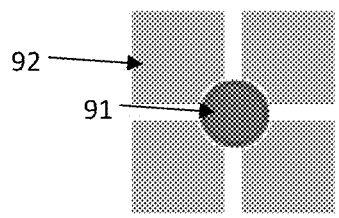
FIG. 5(a)-(d) show some further embodiments of the shear sensor.
Figure 5B:
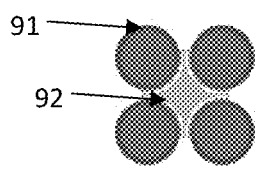
Figure 5:
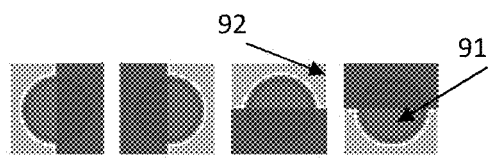

FIGS. 5(*a*)-5(*d*) show some additional embodiments in which the direction and/or the magnitude of the shear stress can be measured. In these embodiments shown, the optoelectronic sources 50 and the photodetectors 60 are arranged in a stack. Such an arrangement is however not critical and the optoelectronic sources 50 and the photodetectors 60 can also both be positioned along the first outer surface 81.

The sensing element 100 in these shown embodiments comprises a first group 91 of at least one optoelectronic source 50 and a second group 92 of at least one photodetector 60 arranged such that the direction and magnitude of the shear stress can be determined by determining which photodetector 60 of the second group 92 detects light emitted by which optoelectronic source 50.

FIG. 5*a* shows for example an embodiment wherein the first group 91 comprises an optoelectronic source 50 and the second group 92 an array of photodetectors, the first group 91 being positioned with respect to the second group 92 such that upon application of a shear stress the intensity measured by a first photodetector 60 of the array decreases while the intensity of a second photodetector 86 of the array increases, the change of intensity from the first photodetector 50 to the second photodetector 86 indicating the direction of the shear stress.

As shown in FIG. 5*a*, the array of photodetectors may comprise four photodetectors arranged in a square-like configuration, the optoelectronic source 50 being positioned substantially in the center of the square-like configuration as such a configuration allows to determine the direction of the shear stress along all directions of the plane in which the photodetectors are provided.

FIG. 5*b* shows another example wherein the first group 91 comprises an array of different optoelectronic sources, such as for example optoelectronic sources emitting light of a different wavelength and/or emitting light having an intensity which is specifically modulated, and the second group 92 a photodetector 60, the first group 91 being positioned with respect to the second group 92 such that upon application of a shear stress the light measured by the photodetector 60 is indicative of the position of one of the optoelectronic sources of the array. As shown in FIG. 5*b*, the array of optoelectronic sources preferably comprises four optoelectronic sources arranged in a square-like configuration, the photodetector 60 being positioned substantially in the center of the square-like configuration as such a configuration allows to determine the direction of the shear stress along all directions of the plane in which the optoelectronic sources are provided.

Figure 5D:
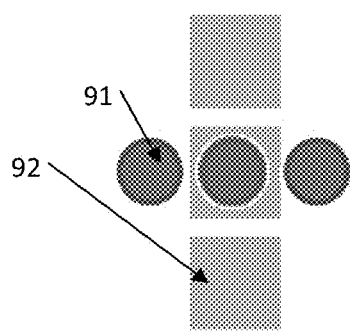

FIGS. 5c and 5d show that the first group 91 also comprises an array of optoelectronic sources. Preferably, the arrays of the first 91 and the second 92 group are substantially linear, as shown in FIGS. 5b and 5d.

According to a first embodiment shown in FIG. 5d, the linear arrays are positioned perpendicular with respect to each other and the optoelectronic sources are different, e.g. optoelectronic sources emitting light of a different wavelength and/or emitting light having an intensity which is specifically modulated to distinguish between the optoelectronic sources as in the earlier described embodiment.

According to a second embodiment shown in FIG. 5c, the two groups are positioned such that pairs of photodetectors and optoelectronic sources are formed. In a first example shown in FIG. 5c, in each pair the optoelectronic source and the photodetector are optically aligned and part of the photodetector or part of the optoelectronic source is covered by a layer that is not transparent to the light emitted by the corresponding optoelectronic source, the part covered being different in each pair such that the intensities measured by the photodetector are indicative of the direction of the shear stress. However, according to a second example not shown in the figures, in each pair the optoelectronic source and the photodetector are not optically aligned and the mutual position of the optoelectronic source and the photodetector in each pair are chosen such that upon application of a shear stress, the direction of the shear stress can be determined by determining which photodetectors detect light and the magnitude of the shear stress can be determined by measuring the intensities of the detected light.

Fabrication of a shear sensor, e.g. a shear sensor comprising a plurality of sensing elements according to one embodiment, can comprise: providing an optoelectronic source 50 on a first substrate 11; embedding the optoelectronic source 50 in a first embedding layer 21; providing electrical contacts 41 to the optoelectronic source 50; providing a photodetector 60 on a second substrate 12; embedding the photodetector 60 in a second embedding layer 22; providing electrical contacts 42 to the photodetector 60; and bonding the first substrate 11 comprising the embedded optoelectronic source 50 to the second substrate comprising the embedded photodetector 60 such that the optoelectronic source 50 and the photodetector 60 are oriented face to face. Bonding can for example be done by means of a layer of silicone, acting as a sensing layer 30.

Alternatively, a shear sensor, e.g., a shear sensor comprising a plurality of sensing elements according to one embodiment, can be fabricated using a build-up process. Such a fabrication process may comprise: providing an optoelectronic source 50 on a first substrate 11; embedding the optoelectronic source 50 in a first embedding layer 21; providing electrical contacts 41 to the optoelectronic source 50; providing a sensing layer 30 on the first embedding layer 21 and the electrical contacts 41; providing electrical contacts 42 for the photodetector 60; mounting the photodetector 60 such that the optoelectronic source 50 and the photodetector 60 are oriented face to face; embedding the photodetector 60 in a second embedding layer 22; and providing the second substrate 12.

In one embodiment, beam shape of the light emitted by the optoelectronic source and the shape of the photodetector are adapted to each other and to the measurement.

To further adapt the light emitted by the optoelectronic source to the requirements of the optical shear sensor, for example extending the range, changing sensitivity or linearity, etc. of the sensor, optical, preferably micro-optical, components such as micro lenses, filters, for examples filters for shaping the beam of the emitted light, for example to provide the beam with a linear profile in a certain direction or to make the characteristics of the emitted light dependent on the position of the optoelectronic source with respect to the photodetector such that, for example, the direction and/or magnitude of the shear stress can be measured.

Experiments were performed wherein a shear sensor according to an embodiment of the present disclosure was fabricated. In a first process, commercially available optoelectronic devices (1×4 VCSEL array chip, 1×4 photodetector array chip) were thinned down to a thickness of 20 micrometer. The naked dies were mounted face down on a temporary glass carrier (i.e. with their front surface oriented to the temporary carrier) with a dedicated glycophtalate wax which proved good adhesion and optimized hardness to protect the brittle small GaAs dies during the lapping processes. Larger dummy GaAs dies were mounted in the same step next to the functional dies to allow a well-controlled pressure distribution over the different dies. The dummies need to have the same thickness to guarantee a good die levelling after mounting. The wax was applied above its melting temperature and an extra load was provided on the dies to obtain a wax layer with a uniform thickness underneath the dies. The backside of the dies was then lapped on a glass plate with a slurry comprising about 9 micrometer thick $Al_2O_3$ grains. The lapping was used to thin down the dies to a thickness of 50 micrometer. After that, an additional about 30 micrometer was removed by means of a polishing process on a soft tissue with an $Al_2O_3$ grain size of about 0.3 micrometer. After the polishing process the dies were removed from the temporary glass carrier.

Figure 4A:
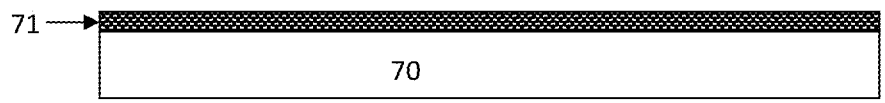
FIGS. 4(a)-4(g) illustrate part of an exemplary fabrication process for a shear sensor according to one embodiment.
Figure 4B:
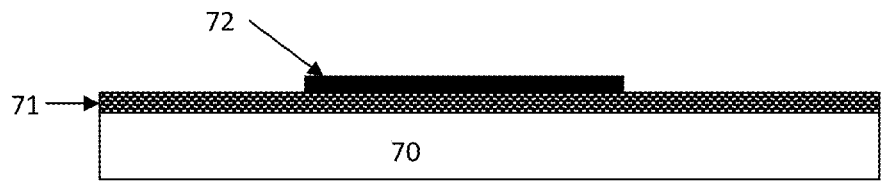

In a next process of the exemplary fabrication process, the dies were embedded in an ultra-thin flexible package. This embedding or packaging process was performed on a temporary rigid carrier, as illustrated in FIG. 4. This process was performed separately for a VCSEL and for a photodetector. On a glass carrier 70, a thin polyimide layer 71 with a thickness in the range between 8 micrometer and 10 micrometer was provided by spin coating (FIG. 4(a)). By applying an adhesion promotor only at the edges of the glass carrier, the polyimide only adheres to the glass at the edges, enabling simple release of the package from the carrier after fabrication. However, other release techniques known to a person skilled in the art can be used, such as for example techniques using thermal release tape. On top of the polyimide layer 71, 10 micrometer thick metal islands 72 (Cu) were formed by a consecutive sputter, plate and wet etch process (FIG. 4(b)). Other techniques known to a person skilled in the art may be used for forming the metal islands. For example, lamination may be used instead of plating. In the final package, these islands 72 act as a heat buffer for the embedded VCSEL or photodetector. The optoelectronic devices 75, such as VCSEL chips and the photodetector chips, used in the experiments only had top electrical contacts. When using optoelectronic sources and/or photodetectors having top and bottom contacts, the metal layer 72 may also be used for forming electrical contacts to the optoelectronic source and/or photodetector.

Figure 4C:
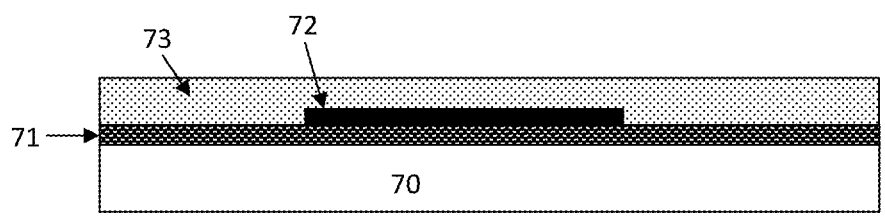
Figure 4D:
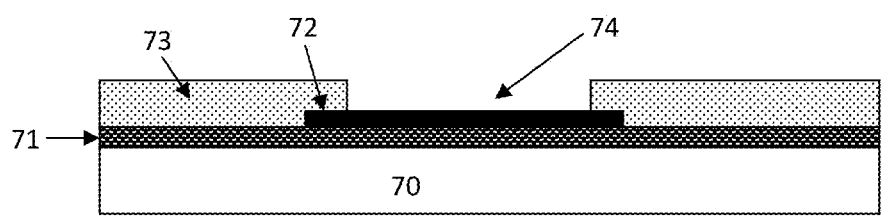
Figure 4:
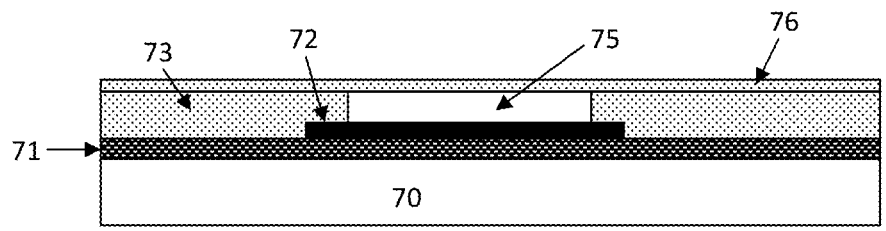
Figure 4:
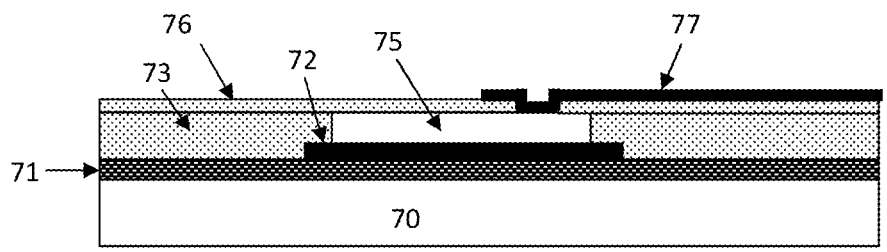
Figure 4:
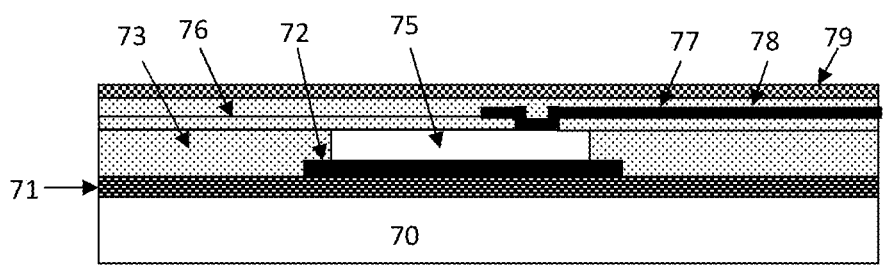

Next a 20 micrometer thick layer of optical transparent embedding material 73 (Truemode Backplane Polymer™) was spin coated, as illustrated in FIG. 4(c). In this layer, a cavity 74 was formed by ablation with a KrF excimer laser (wavelength 248 nm), using the metal islands 72 as a laser stop (FIG. 4(*d*)). This results in a cavity 74 with a flat bottom. Other methods known to a person skilled in the art may be used for forming the cavity 74, such as for example lithography methods. A low viscosity underfill material for flip-chip applications (U 8449-9 from Namics Corporation) was used as an adhesive (not illustrated) to mount the optoelectronic device 75 inside the cavity 74. By pressing the optoelectronic device inside the cavity with a leveller or using pick and place equipment, the die angle with respect to the substrate after hardening of the adhesive can be limited. In a next process, a second layer 76 (about 5 µm thick) of optical transparent material was spin-coated, which makes the die completely embedded. The resulting structure is schematically shown in FIG. 4(*e*).

In a next process, micro-via's were created towards the contact pads of the embedded die 75, by means of a KrF Excimer laser. A sputter and etch process was then used for providing copper tracks 77 from within the vias towards larger pitch contacts on the package (FIG. 4(*f*)). A final layer 78 of optical transparent material (thickness 5 µm) was provided for filling the vias; this layer also acts as a final planarization layer. On top of the stack, a second polyimide layer 79 was spin-coated and cured. The resulting structure (thin optoelectronic package) is shown in FIG. 4(*g*).

The top polyimide layer 79 and the bottom polyimide layer 71 act in this case as mechanical supporting layers. According to the principle of the neutral fiber, most of the stress during bending is taken up by the outer layers of the stack, being the strong polyimide layers. This technology protects the inner optical layers. Commercially available optical materials are often not very strong and flexible, but with a total thickness of only about 40 µm and a build-up with supporting polyimide layers, all materials can be bended to some extent. In one embodiment polyimides can also be used for forming the embedding layers 73, 76 and 78.

In a next process a first optoelectronic package (as shown in FIG. 4(*g*)) comprising an embedded VCSEL chip (optoelectronic device 75 in FIG. 4(*g*)) and a second optoelectronic package comprising an embedded photodetector chip (optoelectronic device 75 in FIG. 4(*g*)) were covered with a thin layer of PDMS (Sylgard 184) as sensing layer. The separate modules were cut-out using a $CO_2$ laser. In a final process they were bonded face to face with the sensing layers facing each other onto each other to obtain a shear sensor according to one embodiment, as shown in FIG. 1.

Initial testing of the shear sensor indicates good alignment of the optoelectronic source and the photodiode, since an optimum photodiode current is generated in the idle condition (no shear stress applied). When increasing the shear force, the photodiode current drops down, till the noise level has been reached. When releasing the shear force, the photodiode current returns back to the initial value, indicating that no hysteresis effects are playing a role.

When fabricating a shear sensor according to one embodiment, preferably the optoelectronic source and a photodetector within a sensing element are optically aligned to each other. Aligning both elements can be done passively or actively. Passive alignment generally refers to a procedure using optical or mechanical alignment marks onto the two substrates which need to be aligned. During active alignment, the optoelectronic source is connected to a power source, and the alignment is achieved by maximizing the electrical current generated by the photodiode.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. An optical shear sensor comprising:
   a first and a second outer surface at opposing sides of the optical shear sensor; and
   at least one sensing element comprising an optoelectronic source configured to emit light of a predetermined wavelength and at least one photodetector configured to detect light of the predetermined wavelength, the optoelectronic source having a source front surface being an outer surface of the optoelectronic source where light of the predetermined wavelength exits the optoelectronic source, the at least one photodetector having a detector front surface being an outer surface of the photodetector where light of the optoelectronic source is to be received,
   wherein the optoelectronic source is positioned along the first outer surface and configured to emit light towards the second outer surface, wherein a flexible sensing layer covers both the front surface of the optoelectronic source and the front surface of the photodetector, the sensing layer being transparent to the predetermined wavelength, wherein the optoelectronic source, the photodetector, the second outer surface and the sensing layer are arranged such that, upon application of a shear stress onto the optical shear sensor, the sensing layer deforms elastically and the first and the second outer surface are displaced along directions parallel to each other and the source front surface and the intensity of light emitted by the optoelectronic source and detected by the photodetector changes, the change in intensity of light emitted by the optoelectronic source and detected by the photodetector being indicative of the applied shear stress.

2. An optical shear sensor according to claim 1, wherein the optoelectronic source and the at least one photodetector are arranged in a stack with the photodetector positioned along the second outer surface, such that the source front surface and the detector front surface are substantially parallel and oriented towards each other with the sensing layer in between the optoelectronic source and the at least one photodetector, wherein the optoelectronic source, the photodetector and the sensing layer are arranged such that, upon application of a shear stress onto the optical shear sensor, the sensing layer deforms and the optoelectronic source and the photodetector are displaced with respect to each other along directions parallel to each other and the source front surface.

3. An optical shear sensor according to claim 1, wherein the photodetector is positioned along the first outer surface, the second outer surface comprising a reflector configured to reflect light emitted by the optoelectronic source back to the photodetector according to the displacement of the first outer surface with respect to the second outer surface.

4. The optical shear sensor according to claim 1, wherein in the absence of shear stress, the optoelectronic source is optically aligned with one photodetector.

5. The optical shear sensor according to claim 1, wherein in the presence of the shear stress on the sensor in a plane parallel to the source front surface, the optoelectronic source is optically aligned with one photodetector.

6. The optical shear sensor according to claim 1, wherein the at least one sensing element further comprises electrical contacts to the optoelectronic source and to the photodetector.

7. The optical shear sensor according to claim 1, wherein the optoelectronic source is embedded in a first embedding layer, wherein the at least one photodetector is embedded in a second embedding layer and wherein the sensing layer is sandwiched between the first embedding layer and the second embedding layer.

8. The optical shear sensor according to claim 7, wherein the first embedding layer and the second embedding layer comprise a flexible material.

9. The optical shear sensor according to claim 7, wherein the first embedding layer and the second embedding layer comprise a stretchable material.

10. The optical shear sensor according to claim 1, wherein the sensing layer is flexible.

11. The optical shear sensor according to claim 1, wherein the sensing layer is stretchable.

12. The optical shear sensor according to claim 1, wherein the sensor is flexible.

13. The optical shear sensor according to claim 1, wherein the sensor is stretchable.

14. The optical shear sensor according to claim 1, wherein the sensing layer comprises a polymer, a polyurethane or a silicone.

15. The optical shear sensor according to claim 1, wherein the sensing layer has a low hysteresis and a shear modulus in the range between about 100 kPa and 300 MPa.

16. The optical shear sensor according to claim 1, wherein the shear sensor comprises a plurality of sensing elements arranged in a two-dimensional array.

17. The optical shear sensor according to claim 1, wherein the sensing element comprises a first group of at least one optoelectronic source and a second group of at least one photodetector arranged such that the direction and/or magnitude of the shear stress is determined by determining which photodetector of the second group detects light emitted by which optoelectronic source of the first group.

18. A method of making an optical shear sensor, the method comprising:
    providing an optoelectronic source on a first substrate;
    embedding the optoelectronic source in a first embedding layer;
    providing electrical contacts to the optoelectronic source;
    providing a photodetector on a second substrate;
    embedding the photodetector in the second embedding layer;
    providing electrical contacts to the photodetector; and
    bonding the first substrate comprising the embedded optoelectronic source to the second substrate comprising the embedded photodetector by a sensing layer such that a front surface of the optoelectronic source and a front surface of the photodetector are substantially parallel and oriented towards each other.

19. A method for making an optical shear sensor according to claim 18, wherein the processes of providing the optoelectronic source on a first substrate;
    embedding the optoelectronic source in the first embedding layer; providing the electrical contacts to the optoelectronic source and the processes of providing the photodetector on a second substrate; embedding the photodetector in the second embedding layer; providing the electrical contacts to the photodetector are done separately after which the first substrate comprising the embedded optoelectronic source is bounded to the second substrate comprising the embedded photodetector by the sensing layer such that the optoelectronic source and the photodetector are substantially parallel and oriented towards each other.

20. A method of making an optical shear sensor according to claim 18, wherein the method is a build-up process, the method further comprising the subsequent processes of:
    providing the optoelectronic source on a first substrate;
    embedding the optoelectronic source in the first embedding layer;
    providing first electrical contacts to the optoelectronic source;
    providing the sensing layer on the first embedding layer and the first electrical contacts;
    providing second electrical contacts for the photodetector to the sensing layer;
    providing the photodetector on the second electrical contacts such that the front surface of the photodetector and the front surface of the optoelectronic source are substantially parallel and are oriented towards each other; and
    embedding the photodetector in the second embedding layer.

21. An optical shear sensor made by a method according to claim 18.

* * * * *